Sept. 3, 1957   J. W. TAYLOR, JR., ET AL   2,805,412
MICROWAVE AUTOMATIC GAIN CONTROL
Filed June 29, 1954
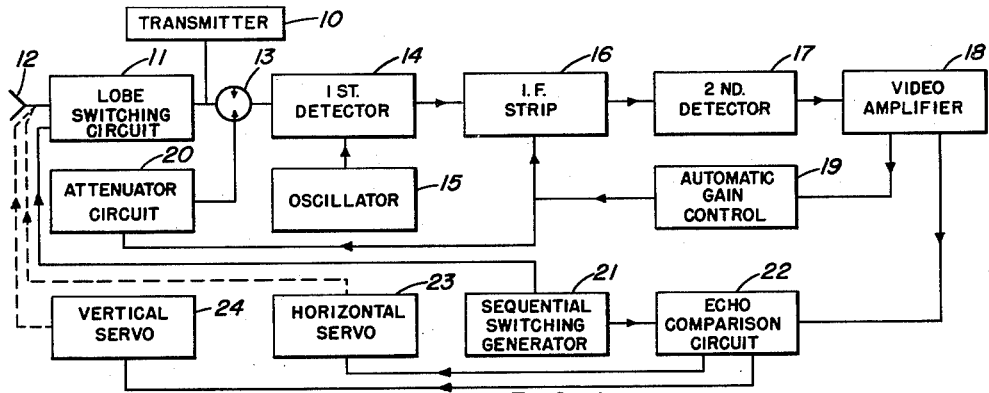
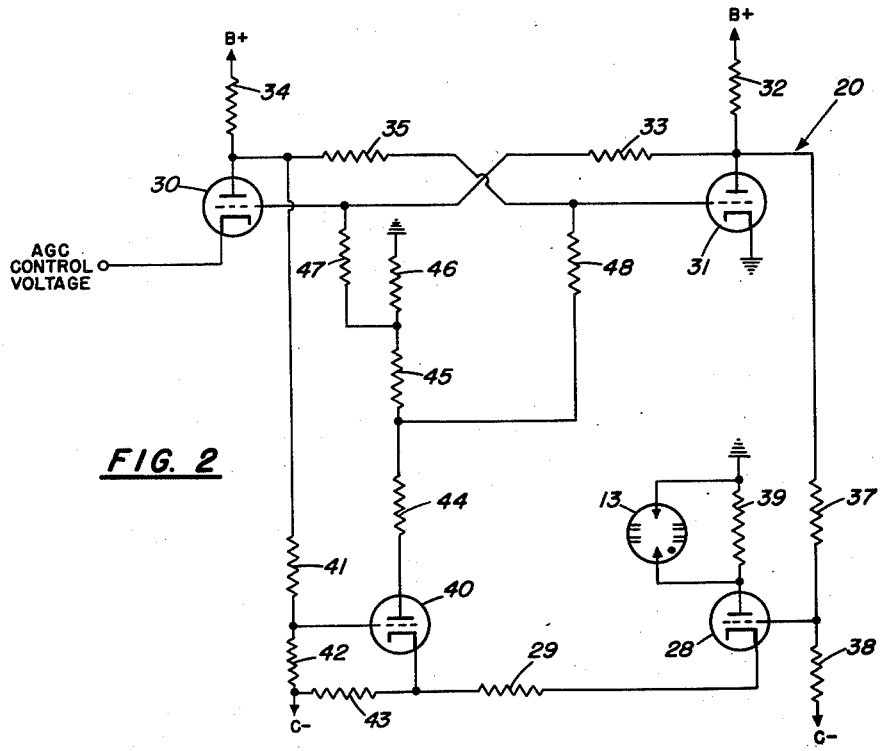
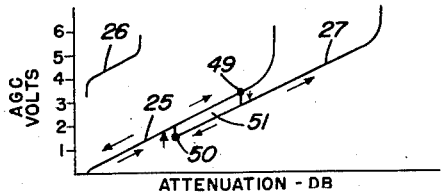
INVENTORS
JOHN W. TAYLOR, JR.
DAVID R. HOUSTON
BY
ATTORNEYS

United States Patent Office 2,805,412
Patented Sept. 3, 1957

2,805,412

MICROWAVE AUTOMATIC GAIN CONTROL

John W. Taylor, Jr., Baltimore, and David R. Houston, Glen Burnie, Md., assignors, by mesne assignments, to the United States of America as represented by the Secretary of the Navy Application June 29, 1954, Serial No. 440,311

11 Claims. (Cl. 343—17.1)

This invention relates to a variable attenuator circuit wherein the amount of attenuation obtained as a result of its operation is proportional to the magnitude of a control voltage applied to the attenuator circuit. More specifically, this invention relates to an improvement for extending the range of operation of a radar tracking receiver which employs an automatic gain control.

Radar receivers of the prior art commonly employ automatic gain control circuits to maintain a selected echo at a constant average level independent of variations in signal strength due to such factors as change in target size, aspect, range, atmospheric conditions, or radar system sensitivity. In aircraft tracking radar systems, particularly, the specific factor of minimum range becomes quite small which in turn necessitates a large variation of system gain in order to obtain a constant average amplitude echo. This characteristic was not obtained in prior art systems over the desired range of operation.

In these aircraft radar tracking systems there is a critical need for a constant average amplitude echo since comparisons of echoes from slightly different directions determine error signals which are used to give a corresponding correction of antenna orientation to track the target. These signals are compared to determine the proper direction of antenna movement required to equalize the echoes, the antenna, by definition, then being pointed at the target. The degree of accuracy with which the target is tracked is therefore directly dependent on the "tightness" of the servo loop directing the antenna, or the loop gain. This gain should be as high as possible, the upper limit being determined by the oscillation of the system. Thus, in this type of system, the constancy of loop gain is of the utmost importance to maintain high accuracy without the possibility of oscillation. Expressed in another way, it is necessary, in a system of this type, for radar echoes of a specified ratio of strength to produce a constant error voltage independent of their average strength. The automatic gain control action must therefore maintain the original strength ratio or dynamic gain while it is adjusting the static gain to give a specified output pulse level. In the conventional radar tracking receiver the desired flat characteristic of variation in loop gain as a function of signal strength exists only over a relatively small decibel range, the gain increasing rapidly as the automatic gain control action forces operation in the non-linear portion of the various amplifying tubes and thereby limiting the range of the receiver.

The instant invention incorporates an attenuator circuit into the conventional radar tracking receiver for supplementing the action of the automatic gain control of the receiver. In this way the useful range of the receiver is extended. In the receiver the output of the automatic gain control circuit is coupled to the I.-F. stage. The attenuator circuit of this invention is also coupled to the automatic gain control output. A variable attenuator type of gas discharge tube which performs the function of a T-R and attenuator tube is a part of the attenuator circuit and is operatively positioned in the receiver in the microwave region prior to the first detection stage. Under normal operating conditions of the receiver only the output of the automatic gain control to the I.-F. stage attenuates the signal which is received by the receiver. However, when the automatic gain control voltage goes beyond a predetermined value the attenuator circuit, in response to the automatic gain control voltage which is coupled thereto, causes the attenuator tube to attenuate the received signal in the microwave region of the receiver by an amount which is proportional to the automatic gain control voltage. The circuit for selectively causing the variable attenuator to attenuate the incoming signal to the receiver consists of a multivibrator type of switching arrangement. This arrangement normally prevents attenuation by the attenuator tube but switches its condition to insert the variable attenuation characteristic of the attenuator tube into the circuit only when the automatic gain control voltage, which is coupled thereto, goes beyond its usable range. When this condition exists, the attenuator tube attenuates the incoming signal in the R.-F. stage and the automatic gain control circuit attenuates the signal in the I.-F. stage, each doing this by an amount which is proportional to the magnitude of the incoming signal. The microwave attenuator is variable within fixed limits, and can be inserted, varied, and removed from the circuit by the control of a single direct voltage. The attenuator circuit allows the use of the attenuator tube as an element of the automatic gain control loop by making the effect on the automatic gain control voltage of the insertion of minimum attenuation less than that required to remove this attenuation. Thus it can be seen how the range of automatic gain control action can be extended by the use of the attenuator circuit.

It is one object of this invention to extend the normal range of operation of an automatic gain control of a radar receiver.

It is another object of this invention to disclose an attenuator circuit which produces an amount of attenuation which varies with the magnitude of a control voltage applied thereto.

Other objects and many of the attendant advantages of this invention will be readily appreciated as the same becomes better understood by reference to the following detailed description when considered in connection with the accompanying drawings wherein:

Fig. 1 discloses a block diagram of a radar receiver which incorporates the attenuator of the present invention;

Fig. 2 is a circuit diagram of the attenuator of the present invention; and

Fig. 3 is a graph which depicts the action of the attenuator tube in extending the range of the radar receiver.

Fig. 1 discloses a radar system which incorporates the attenuator circuit of the instant invention. A radar transmitter 10 transmits a signal through lobe switching circuit 11 to antenna 12. The signal which is received from the target is received by antenna 12, passed through the lobe switching circuit 11 and then through T-R tube 13 to the remaining components of the radar receiver. The conventional action of the T-R tube 13, which can be an x7047 tube or another tube type having similar characteristics, is that of a power sensitive switch which prevents damage to the receiver during transmission of the radar pulse. More specifically, it accomplishes this by firing or arcing across its tuned cavity when abnormal amounts of R.-F. energy are present. On the other hand, normal radar echoes have insufficient energy to fire the T-R tube and these echoes pass through the T-R tube to the receiver unattenuated. However, in this invention the T-R tube also acts as an attenuator tube to modify the amplitude of the received signal, when necessary, and thereby extend the usable range of the radar receiver. Since the signal at the output of the attenuator tube 13 is very high in frequency it is mixed in the first detector 14 with the output of the local oscillator 15. The signal from detector 14 is capable of being amplified by the I.-F. strip 16. The output of the I.-F. strip is converted by the operation of a second detector 17 to a video frequency signal which is amplified by the video amplifier 18. A sample of the video signal from video amplifier 18 is channeled into the automatic gain control circuit 19. The automatic gain control converts the video signal into a normally negative direct voltage such that as the amplitude of the video increases the amplitude of the negative direct voltage increases. The negative direct voltage, thus developed, is connected back to the control grids of the several amplifiers in the I.-F. strip 16. With a connection such as this the direct voltage of the automatic gain control serves to bias these tubes. The output of the automatic gain control circuit thus controls the overall gain of the I.-F. strip by controlling the bias on several of its amplifying sections. In the operation of the entire system, if the received signal at the input to the I.-F. strip tends to increase in amplitude, the output of the video amplifier has a corresponding tendency. However, such an increase causes the direct voltage of the automatic gain control circuit to increase negatively. Therefore, a reduction in overall gain of the I.-F. strip results from the increased bias to the automatic gain controlled stages. This reduction in I.-F. gain within the linear region of the automatic gain control action corresponds in decibels to the decibel increase of the I.-F. input signal. The end result of increased input to the I.-F. strip is increased (negative) automatic gain control voltage and therefore a constant video output. The same output from automatic gain control 19 is used by attenuator circuit 20 to further extend the range of operation of the radar receiver in a manner which will be explained in detail hereafter.

The particular system shown in Fig. 1, as stated above, is an automatic tracking radar set which receives echoes sequentially from four slightly different directions and compares these signals to orient the antenna so that it is pointed at this target. For accomplishing this tracking function a sequential comparison system is incorporated into the radar system. The sequential comparison system consists of a sequential switching generator 21 which is coupled to the lobe switching circuit 11 which intermittently energizes the antenna in predetermined orientations thereof. The echo comparison circuit 22 receives signals from both the sequential switching generator 21 and video amplifier 18, the generator 21 serving the function of synchronizing the echo comparison circuit with the output of the video amplifier 18. The echo comparison circuit 22 compares the echoes received by the antenna from four slightly different directions and produces a signal which is proportional to the difference in strength of these signals. These signals produced by the echo comparison circuit are coupled to the horizontal servo 23 and vertical servo 24 which in turn are mechanically coupled to the antenna 12. The servos 23 and 24, in response to the signals which they receive from the echo comparison circuit 22 position the antenna 12 in such a manner as to equalize the target echoes received by the antenna from the four slightly different directions. When the four target echo signals received by the antenna are equal, the antenna 12, by definition, is pointed at the target. In this manner the radar system tracks a target.

It is to be noted at this point that the T-R and attenuator circuit of the present invention is not intended to be restricted to the particular radar system shown in Fig. 1. The T-R and attenuator circuit can be put to any use to which it is applicable as will be readily seen from the ensuing description. However, it is to be pointed out that the use of the T-R and attenuator circuit is particularly advantageous in the radar system shown in Fig. 1 because in this system the dynamic gain as well as the average amplitude of video output pulses must be held constant.

Fig. 3 is a graph which depicts the action of the attenuator tube in extending the range of the radar receiver. Numeral 25 depicts the typical static automatic gain control curve of the receiver alone. Numeral 26 shows the attenuation characteristic of an attenuator tube alone. Numeral 27 depicts the composite curve which is obtained when curves 25 and 26 are combined by the action of the attenuator circuit. It can thus be seen how the range of the automatic gain control action is extended by the use of the attenuator circuit of the instant invention.

Fig. 2 is a circuit diagram of the attenuator circuit which is used for incorporating the variable attenuator tube 13 into the radar receiver circuit. This attenuator circuit is necessary because of the discontinuous nature of the attenuation curve 26, Fig. 3, due to the requirement for a minimum current to maintain a discharge of the attenuator tube. Were it not for the discontinuous nature of the attenuation curve, the direct voltage of the automatic gain control used for control of the I.-F. stages could be used directly by the attenuator tube. Because of the foregoing characteristic of the attenuator tube, infinite gain at the point of discontinuity would cause oscillations when there is operation in this region. Therefore the condition would shift between tube fired, insufficient automatic gain control voltage to maintain it, and tube unfired, too much automatic gain control voltage to keep it from firing.

The attenuator circuit shown in Fig. 2 overcomes the above described drawbacks of an attenuator tube which is coupled directly to the automatic gain control. The T-R and attenuator tube 13 is supplied with current through triode 28 which in conjunction with cathode resistor 29 thereof, which couples the cathode to triode 40 to the cathode of triode 28, forms a constant current source insensitive to change in impedance of the attenuator tube. Control of the current to attenuator tube 13 is obtained through the two multivibrator triodes 30 and 31 and cathode follower triode 40. Triode 30 is normally non-conducting, and triode 31 is normally conducting. The grid of triode 30 is coupled to the junction of resistors 33 and 47 both of which with resistor 46 couple the plate of triode 31 to ground. The plate of triode 31 is coupled to B+ through load resistor 32. Thus it can be seen that since voltage at the plate of triode 31 is at a relatively low level when it is conducting that the voltage on the grid of triode 30 will also be at a relatively low level and therefore provide the bias necessary to keep triode 30 cut off. The grid of triode 31 is coupled to the junction of resistors 35 and 48, both of which in combination with resistors 46 and 45 couple the plate of triode 30 to ground. The plate of triode 30 is coupled to B+ through load resistor 34. Therefore it can be seen that when triode 30 is not conducting the voltage on the plate thereof is at a relatively high level which in turn causes the voltage at the grid of triode 31 to be at a relatively high level to thereby cause triode 31 to maintain its conduction. The negative automatic gain control voltage is coupled directly to the cathode of triode 30. When the automatic gain control voltage becomes sufficiently negative triode 30 will start to conduct. Thus the voltage on the plate of triode 30 will drop and cause a corresponding voltage drop at the grid of triode 31 which in turn will tend to bias triode 31 to cut off. When triode 31 tends toward cut-off the voltage on its plate will increase which will cause a corresponding increase of voltage on the grid of triode 30 which in turn will cause greater conduction of triode 30. This switching action will cause the multivibrator circuit to change its condition so that triode 31 is fully cut off and triode 30 is conducting. The plate of normally conducting triode 31 is coupled to the grid of triode 28 through resistor 37. The grid of triode 28 is coupled to C− through grid biasing resistor 38. When triode 31 is conducting the attenuator tube 13 is non-conductive because of the grid control exercised by triode 31 on triode 28 to prevent the latter from conducting. It will be noted at this point that resistor 39 couples the plate of triode 28 to ground and that attenuator tube 13 is connected across resistor 39. In this manner attenuator tube is permitted to be slightly conductive rather than fully cut off. The plate of normally non-conducting triode 30 is coupled to the grid of cathode follower triode 40 through biasing resistor 41. The grid of triode 40 is coupled to C− through biasing resistor 42 and the cathode thereof is coupled to C− through cathode biasing resistor 43. It will therefore be noted that the change in voltage on the plate of triode 30 affects the conduction of cathode follower 40 which in turn affects the potential on the cathode of triode 28, the latter occurring because of the cathode follower connection between triodes 40 and 28. The plate of cathode follower triode 40 is coupled to ground through resistors 44, 45 and 46.

The attenuator circuit of Fig. 2 operates in the following manner: Triode 31 will conduct when the automatic gain control voltage of the radar receiver is within the lower portion of the curve 25, Fig. 3. Since triode 31 is conducting triode 30 will be non-conducting because of the relatively negative bias on the grid thereof. Furthermore, since triode 31 is conducting the conduction of triode 28 will be at a minimum because of the grid control exercised by triode 31 on triode 28. As the cathode of triode 30 goes more negative so that the automatic gain control voltage (more attenuation desired) shown curve 25 reaches the upper portion thereof, the point is reached where tube 30 is forced to conduct. The multivibrator, consisting of tubes 30 and 31 and the associated circuitry, shifts its condition making triode 31 non-conductive and thereby increasing the conduction of triode 30. The plate voltage of triode 30 decreases and that of triode 31 increases. The increase of plate voltage in triode 31 causes a corresponding increase in the voltage on the grid of triode 28 whereas the decrease in plate voltage of triode 30 causes a decrease of grid voltage of cathode follower triode 40 which in turn, because of its cathode follower connection with triode 28, causes a lowered cathode voltage on the latter. Thus a greater current will flow through triode 28 and a correspondingly greater current will flow through attenuator tube 13 thereby increasing its attenuation. The current which flows through attenuator tube 13, as determined by the voltage on the plate of triode 31, is greater than the minimum required for sustained discharge. The lowered voltage on the plate of triode 30 is now variable with the automatic gain control voltage on the cathode of triode 30. The lowered plate voltage of triode 30, when it is conducting, increases the current flow through attenuator 13 above the minimum set by triode 31. The increased attenuation which has been inserted by the firing of the attenuator tube 13 causes a reduction of the automatic gain control voltage in the radar receiver. However this reduction of automatic gain control voltage is insufficient to switch the multivibrator back to its original condition due to the multivibrator action which places switch-back control in the hands of triode 31. Thus there is no tendency for oscillation of the attenuator tube.

More specifically, the above described circuit is adjusted so that attenuation is inserted when the automatic gain control voltage goes more negative beyond a predetermined value, point 49, Fig. 3, and removed when it goes more positive above different value, point 50, Fig. 3. This feature provides an electrical backlash sufficient to prevent oscillations which would be present if the voltage required to initiate conduction of attenuator tube 13 were not in excess of that required to maintain conduction. This oscillation would normally occur because the automatic gain control voltage would decrease negatively (become more positive) upon the insertion of attenuation by the attenuator tube which in turn would cause the discharge in the attenuator tube to go out because of insufficient current only to be reinitiated by decreased automatic gain control voltage resulting from the lack of attenuation of echoes by the attenuator tube.

As stated above, when conduction of attenuator tube 13 is initiated by the switching of multivibrator tubes 30 and 31 the resultant decrease in automatic gain control voltage is insufficient to flip the multivibrator back to its original condition. That is, a minimum amount of microwave attenuation is inserted instantaneously by the action of triode 31 on triode 28 and the counteracting decrease in I.-F. attenuation is accomplished by an automatic change of automatic gain control voltage which is insufficient to cause the microwave attenuation to be removed. As the incoming echo to the radar receiver continues to grow stronger, the automatic gain control voltage increases both I.-F. and microwave attenuation, see Fig. 3, the latter as a result of the amplifying action of triodes 30 and 40. However, if the receiver echo signal decreases the circuit will produce the hysteresis loop 51, Fig. 3. It is to be further noted that a similar hysteresis action is inherently produced by the action of the gas filled attenuator tube 13 since more voltage is required to initiate the gaseous discharge therein than to maintain it.

It is to be further noted that saturation of triode 28, Fig. 2, prevents it from drawing more than rated current. Resistor 44, which is coupled to the plate of cathode follower triode 40 is so chosen that triode 40 will saturate before the attenuator current decreases to the minimum necessary to maintain the discharge.

It is again to be noted at this point that the gas filled tube 13 performs the dual function of a microwave attenuator and a T-R tube. Thus it can be used for controlling the attenuation of low level signals by the application of a gas discharge current, and it automatically fires and blocks R.-F. signals above a critical level such as exist when the radar pulse is transmitted over the same antenna.

Obviously many modifications and variations of the present invention are possible in the light of the above teachings. It is therefore to be understood that within the scope of the appended claims the invention may be practiced otherwise than as specifically described.

Having thus described our invention we claim:

1. A radar system comprising a transmitter, a receiver, a transmitting-receiving and attenuator tube coupled between said transmitter and said receiver, an automatic gain control circuit operatively connected in said receiver for producing a voltage for maintaining the output of said receiver at a constant average level, and an attenuator circuit coupled between said automatic gain control circuit and said transmitting-receiving and attenuating tube for causing attenuation of the signals received by said receiver when said automatic gain control voltage goes beyond a predetermined level whereby the range of the receiver is extended.

2. A radar system for detecting the presence of a distant object comprising a transmitter for producing a series of spaced pulses, a receiver for receiving echo pulses reflected from said distant object, a transmitting-receiving and attenuator tube coupling said transmitter and receiver, an automatic gain control circuit operatively coupled within said receiver for maintaining the output of said receiver at a constant average level, and an attenuator circuit coupled between said automatic gain control circuit and said transmitting-receiving and attenuator tube for causing said attenuator tube to attenuate said echo pulses when said automatic gain control circuit is forced to operate beyond its normal range whereby the useful range of said receiver is extended.

3. An attenuator circuit for extending the range of a radar receiver having an automatic gain control voltage comprising a normally conducting electron discharge tube, a normally non-conducting electron discharge tube, means coupling said electron discharge tubes whereby conduction of one tube precludes conduction of the other tube, means for coupling said automatic gain control voltage to said normally non-conducting tube whereby said normally non-conducting tube will conduct when said automatic gain control voltage goes beyond a predetermined value, an amplifying electron discharge tube coupled to the outputs of said electron discharge tubes for passing a predetermined current as a result of said normally conducting tube becoming non-conducting and a supplemental amount of current which is proportional to the magnitude of said automatic gain control voltage applied to said normally non-conducting electron tube which is now conducting, and a variable attenuator tube coupled to the output of said amplifying tube for producing an amount of attenuation which is proportional to the output of said amplifying tube.

4. An attenuator circuit for producing attenuation when a direct voltage of a predetermined magnitude is applied thereto and for varying said attenuation as said direct voltage varies beyond said predetermined magnitude comprising a first electron discharge tube which is normally conduting, a second electron discharge tube which is normally non-conducting, means coupling said first and second electron discharge tubes whereby conduction of one tube precludes conduction of the other tube, means for coupling said direct voltage to said second electron discharge tube for causing said tube to conduct when said direct voltage goes beyond a predetermined magnitude, a third electron discharge tube operatively coupled to said first and second tubes for producing a predetermined output when said first tube becomes non-conducting and for producing a supplemental output which is proportional to the magnitude of said direct voltage applied to said second tube when it is conducting, and a variable attenuator tube coupled to the output of said third tube for producing an amount of attenuator which is proportional to the output of said third tube.

5. An attenuator circuit for producing a variable attenuation when a varying direct voltage having a predetermined magnitude is applied thereto comprising a first electron discharge tube which is normally conducting, a second electron discharge tube which is normally non-conducting, means coupling said first and second electron discharge tubes for precluding conduction of one tube when the other is conducting, means for coupling said direct voltage to said second electron discharge tube for causing said tube to conduct when said direct voltage goes beyond a predetermined magnitude, a third electron discharge tube operatively coupled to said first and second tubes, said third tube producing a given output when said first tube is conducting and said second tube is non-conducting, said third tube producing a predetermined output when said first tube becomes non-conducting and producing a supplemental output which is proportional to the magnitude of said direct voltage applied to said second tube when it is conducting, and a variable attenuator tube coupled to the output of said third tube for producing an amount of attenuation which is proportional to the output of said third tube.

6. An attenuator circuit for producing a variable attenuation when a varying direct voltage reaching a predetermined magnitude is applied thereto comprising a first electron tube having a cathode, grid, and plate, said first tube being normally conducting, a second electron tube having a cathode grid, and plate, said second tube being normally non-conducting, means coupling said first and second tubes for precluding conduction of one tube when the other is conducting, means coupling said direct voltage to the cathode of said second electron tube for causing said tube to conduct when said direct voltage goes beyond a predetermined magnitude, a third electron discharge tube having a cathode, grid, and plate, means coupling the grid of said third tube to the plate of said first tube whereby said third tube produces a predetermined output when said first tube becomes non-conducting, means coupling the plate of said second tube to the cathode of said third tube whereby said third tube produces a supplemental output which is proportional to the magnitude of said direct voltage which is applied to the cathode of said second tube when it is conducting, and a variable attenuator tube operatively coupled to the plate of said third tube for producing an amount of attenuation which is proportional to the output of said third tube.

7. A radar system comprising a transmitter, a receiver, a transmitting-receiving and attenuator tube operatively coupling said transmitter and receiver, an automatic gain control circuit operatively coupled within said receiver for producing a voltage for maintaining the output of said receiver at a specified level, and an attenuator circuit coupled to said automatic gain control voltage for attenuating the signals received by said receiver when said automatic gain control voltage goes beyond a predetermined level, said attenuator circuit comprising a first electron discharge tube which is normally conducting, a second electron discharge tube which is normally non-conducting, means for coupling said automatic gain control voltage to said second electron tube for causing said tube to conduct when said automatic gain control voltage goes beyond a predetermined magnitude, a third electron discharge tube operatively coupled to said first and second tubes, said third tube producing a given output when said first tube is conducting and said second tube is non-conducting, said third tube producing a predetermined output when said first tube becomes non-conducting and producing a supplemental output which is proportional to the magnitude of said automatic gain control voltage applied to said second tube when it is conducting, and means coupling the output of said third tube to said transmitting-receiving and attenuator tube, said tube attenuating the incoming signal to said radar receiver by an amount which is proportional to the output of said third tube.

8. An attenuating sysem for supplementing the automatic gain control for a radar unit capable of utilizing a transmit-receive device and having an automatic gain control circuit system, said attenuating system comprising: a transmit-receive attenuator tube for connection into the radar unit to replace the conventional transmit-receive device, said transmit-receive attenuator tube performing the function of a transmit-receive tube and also attenuating the received radar echo signal as a function of a control signal; and an attenuator circuit connectable to and energizable by the output of the radar automatic gain control circuit for producing said control signal when the absolute value of the automatic gain control output is larger than a predetermined value.

9. The attenuating system of claim 8 wherein the attenuator circuit includes a variable impedance element which in cooperation with a source of D. C. voltage can produce a D. C. current control signal which is insensitive to change in the impedance of said transmit-receive attenuator tube.

10. The attenuating system of claim 9 wherein the attenuator circuit includes a source for producing three voltages, one of which occurs solitarily to increase the impedance of said impedance element so that the energization of the transmit-receive attenuator tube is no greater than the minimum required for sustained discharge thereby producing very little attenuation, and the other two voltages of which occur simultaneously, one of these other two voltages causing said transmit-receive attenuator tube to be energized to a degree greater than the minimum required for sustained discharge, and the other of the other two voltages being variable with said automatic gain control output and causing the output of said source of D. C. voltage to vary in a like manner.

11. The attenuating system of claim 10 wherein the attenuation circuit includes a voltage sensitive switching circuit responsive to the automatic gain control output such that when the absolute value of the automatic gain control output exceeds a first predetermined value at a time when said solitary voltage is being produced, said switching circuit causes cessation of the solitary voltage and initiation of the two simultaneous voltages and when the absolute value of the automatic gain control output decreases below a second predetermined value, different from first predetermined value, at a time when the two simultaneous voltages are being produced, said switching circuit then causes cessation of the two simultaneous voltages and initiation of the solitary voltage.

References Cited in the file of this patent

UNITED STATES PATENTS

| | | |
|---|---|---|
| 2,445,445 | Marcum | July 20, 1948 |
| 2,492,363 | Kellogg | Dec. 27, 1949 |
| 2,546,370 | Ostendorf et al. | Mar. 27, 1951 |

FOREIGN PATENTS

| | | |
|---|---|---|
| 682,949 | Great Britain | Nov. 19, 1952 |